United States Patent [19]
Solmos

[11] Patent Number: 4,912,978
[45] Date of Patent: Apr. 3, 1990

[54] APPARATUS FOR DETERMINING THE OSCILLATION PARAMETERS OF A BAND

[75] Inventor: Alexander Solmos, Muggensturm, Fed. Rep. of Germany

[73] Assignee: Kernforschungszentrum Karlsruhe GmbH, Karlsruhe, Fed. Rep. of Germany

[21] Appl. No.: 252,536

[22] Filed: Oct. 3, 1988

[30] Foreign Application Priority Data

Oct. 2, 1988 [DE] Fed. Rep. of Germany ....... 3733345

[51] Int. Cl.$^4$ ............................................ G01N 29/00
[52] U.S. Cl. .......................................... 73/579; 73/28; 73/DIG. 1
[58] Field of Search .................... 73/570, 579, 584, 28, 73/54, 59, 61 R, DIG. 1

[56] References Cited

U.S. PATENT DOCUMENTS

| 4,177,434 | 12/1979 | Ida ............................................ 73/59 |
| 4,799,378 | 1/1989 | Portman, Jr. et al. .................. 73/54 |

FOREIGN PATENT DOCUMENTS

0214366A2 3/1987 European Pat. Off. .
3514679A1 10/1986 Fed. Rep. of Germany .

OTHER PUBLICATIONS

Langdon, R. M., "Vibratory Process Control Transducers," Marconi Rev. (GB), vol. 43, No. 218, 3rd Quarter 1980, pp. 168–172.

Primary Examiner—Hezron E. Williams
Assistant Examiner—Mark A. Spector
Attorney, Agent, or Firm—Spencer & Frank

[57] ABSTRACT

An apparatus is provided for determining the natural frequencies of a longitudinally oscillating band excited by a transmitting oscillator, and whose oscillations are received by a receiving oscillator and evaluated. At least one of the exciting oscillator and the receiving oscillator is a sandwich oscillator having metal end masses. The oscillations are transmitted longitudinally along the pre-tensioned length of the band disposed between the transmitting oscillator and the receiving oscillator. An attachment device for attaching the band to the respective oscillators includes a roller which is spring-biased to rest in a groove formed in one face of each of the respective oscillators.

14 Claims, 2 Drawing Sheets

APPARATUS FOR DETERMINING THE OSCILLATION PARAMETERS OF A BAND

BACKGROUND OF THE INVENTION

The present invention relates to an apparatus for determining the oscillation parameters of a longitudinally oscillating band, for example a tape or ribbon, excited by a piezoelectric oscillator and whose oscillations are to be received and evaluated. The apparatus is used for measuring dust concentration in a fluid.

In the course of research work, discussed in a report entitled "Measurement of Emissions from Power Stations" by Theodor Gast and Karl Ulrich Kramm submitted to Bundesministerium für Forschung und Technologie published October, 1984, tests have been made to determine to what extent the natural frequencies of a longitudinally oscillating band change when its inert mass changes. In an experimental arrangement employed for this purpose, a transmitter and a receiver are provided which are piezoelectric oscillators and which are arranged opposite one another at a defined distance. A band is held between the oscillators by means of first and second collet chucks which are each clamped in between the piezoelectric oscillators by way of a disc-shaped thickened portion.

The oscillations of the transmitter are transferred through the band and the second chuck to the oppositely disposed piezoelectric oscillator operating as the receiver, which thereby produces an output signal. In this experimental arrangement, the frequency of the transmitter is controlled in such a manner that a phase shift of 90° exists between the phases of the excited and received waves, causing a standing wave to be formed having nodes at the clamping points (e.g., the first and second collet chucks). Experiments have shown that, for example, an increase in mass in the center region of the band results in a decrease in amplitude of the standing wave, and this change in amplitude could be used as a measuring value. In addition, it was found that the frequency is influenced, and this change in frequency could also represent a measuring variable. A chamber plunger structure and a pressure plate of this kind is described by Theodor Gast and Karl Ulrich Kramm in more detail in the European Patent Application No. 0 214 366 A2 and in the figure therein.

However, this "chamber-plunger structure" has considerable drawbacks. For example, the force generated by means of the piezoelectric element and acting on the plunger must be opposed by a counterforce produced by the enclosing chamber itself (i.e., by the corresponding front or rear pressure plate). Furthermore, in this device, synchronism of the piezoelectric element, which is necessary for conversion of input electrical energy to mechanical energy of the band, is not ensured. Therefore, it may be possible that not only the plunger—as is assumed in the ideal case—but the entire system of the chamber, the plunger, and the piezoelectric element oscillates, i.e. only part of the mechanically-produced energy is ultimately transferred to the band and detected at the receiver as a band signal. Consequently, bands having high material attenuation or a long length are not usable to produce a signal that can be evaluated.

Due to its complex mechanical structure, the foregoing system necessarily includes a plurality of "spring to mass" couplings, which all produce undesirable individual mechanical resonances. As a result of the external dimensions and material constants of the foregoing system, these undesirable individual mechanical resonances all lie in the intended useful frequency range of the measurements. However, an unequivocal evaluation of the resultant measurements can be made only if no natural resonance occurs in the transmitter or receiver below the uppermost measuring frequency. The prior art system exhibits these subordinate resonance phenomena beginning at 7 KHz, and therefore the measuring frequency has to be less than 7 KHz.

A practical embodiment of the apparatus with changed dimensions (larger plunger, chamber, and piezoelectric element) exhibits resonances over the entire frequency range (1 KHz to 40 KHz) measured, so that accurate and reliable results cannot be ensured. The resonant frequencies (e.g., subordinate resonances) of the undesirable "spring to mass" couplings are not frequency stable. They are subject to a great extent to extraneous influences such as, for example, tightening moments from the clamping screws, ambient temperature, mechanical shocks occurring during transport, and so on. The "tuning" of such systems is extremely difficult since there are interacting factors. That is, the effect of a change in one parameter can be evaluated only by observation of the total frequency spectrum of the system, e.g. a Fourier analysis, which, however, is possible in relatively few cases. For the above reasons, the aforementioned prior art device is not suitable for use in practice (especially for use in the rough surroundings of a power plant where this invention could be used).

Although piezoceramic high power transducers are known ("Technologie und Anwendungen von Ferroelektrika" [Technology and Uses of Ferroelectric Elements], published by VAG Leipzig, 1976, pages 360 et seq.), these serve to generate the acoustic output power of ultrasound transducers employed, for example, for cleaning purposes (in water as a prerequisite) or for underwater signal transmission (page 360, second paragraph, lines 4 and 5). Their use as elements for transferring forces to bands or the like that are mechanically coupled to them, for example under environmental conditions or in flue gas chimneys, is neither mentioned nor suggested.

SUMMARY OF THE INVENTION

It is an object of the present invention to provide an apparatus for determining the oscillation parameters of a longitudinally oscillating band ribbon which is excited by a piezoelectric oscillator to produce oscillations therein which are to be detected and evaluated, such that it is possible, with high utilization of the oscillation energy and an improved signal to noise ratio, to generate constant amplitude longitudinal oscillations over a broad frequency band, to mechanically transfer these oscillations to an oscillating band and to reliably detect the longitudinal oscillations transmitted by the band so that standing waves are produced, for determining the parameters of the band.

The above and other objects are accomplished according to the invention by the provision of an apparatus for determining the natural frequencies of a longitudinally oscillating band excited by an oscillator, and whose oscillations are received by a receiving oscillator and evaluated, and wherein at least one of the exciting oscillator and the receiving oscillator is a sandwich oscillator having metal end masses, the sandwich oscillator including a pair of oppositely polarized piezoelectric oscillators connected together and an end mass disposed on both ends thereof.

It is a further object of the invention to provide an apparatus for determining the oscillation parameters of a longitudinally oscillating band ribbon which is excited by a piezoelectric oscillator wherein at least one of the exciting oscillator and the receiving oscillator is a sandwich-type oscillator having metal end masses.

In the apparatus according to the invention, interfering resonances in the operating frequency range are avoided, and the band parameters are related in an unequivocal manner such that undesirable electronic and mechanical energy losses, such as those occurring in undesirable additional "springmass" systems, are considerably reduced compared to prior art devices. Moreover, according to the invention the useful frequency spectrum is broadened compared with that of the prior art, thereby improving the sensitivity $\Delta f/\Delta m$ of the device, where $\Delta x$ represents the change in frequency and $\Delta m$ represents the change in mass, and shifting the operating frequency out of the audio range. No tuning is required for the system according to the invention, and interfering environmental influences are excluded. It therefore is possible to ensure utility of the present invention in practice in even rough surroundings.

The invention will be described in greater detail below with reference to an embodiment that is illustrated in the drawings.

DETAILED DESCRIPTION OF THE PREFERRED EMBODIMENT

Figure 1:
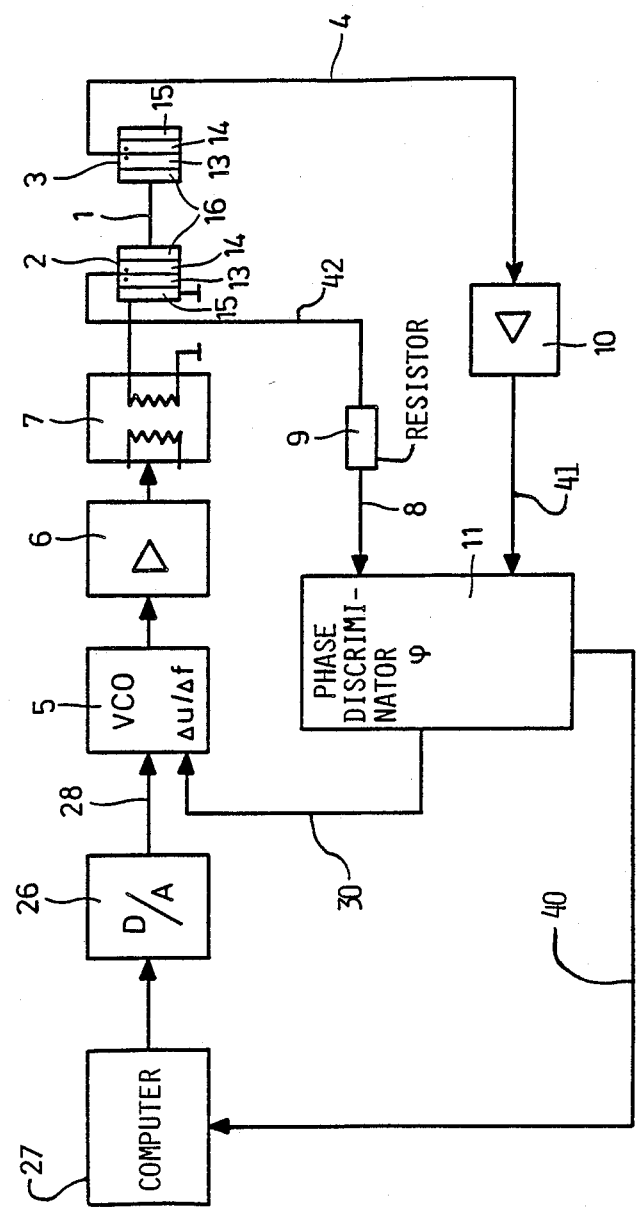
FIG. 1 is a schematic diagram of the apparatus according to the invention for determining the oscillation parameters of a band.

In FIG. 1, a band 1 is clamped to both a transmitter 2 and a receiver 3 and is tensioned. The transmitter 2 and the receiver 3 each have piezo-compression-type oscillators 13 and 14. A sinusoidal alternating voltage applied to the oscillators 13 and 14 changes the thickness thereof. The transmitter 2 and the receiver 3 each have end masses 15 and 16 which are accelerated by the motion of the oscillators 13 and 14 along the longitudinal axis 20 (shown in FIGS. 2 and 4) of the oscillations. The band 1, coupled to the transmitter 2 at a frontal face 22 of the end mass 16 thereof (shown in FIGS. 4 and 5), transmits these oscillations from the transmitter 2 to the receiver 3. At the receiver 3, a pair of corresponding piezo-compression-type oscillators 13 and 14 convert the mechanical excitation, which is transferred from the band 1 to the end mass 16, into an electrical output signal 4.

The signal 4 is amplified in an amplifier 10 to produce an amplified signal 41 which is output to a phase discriminator 11. A transmitter signal 42 is supplied by the transmitter 2 to a resistor 9 which reduces the magnitude of the signal to produce a transmitter reference signal 8. At the discriminator 11, the signal 41 is compared with the transmitter reference signal 8. A standing wave condition of the band 1 can be determined to exist, inter alia, if the signals 4 and 8 are relatively shifted in phase by 90°.

The phase discriminator 11 furnishes an output signal 30 as a direct voltage which is proportional to the amount by which the phase angle between signals 8 and 41 differs from 90°. The output signal 30 is fed to a voltage controlled oscillator (VCO) 5 which has an output signal having an alternating voltage U and a frequency f. The frequency f of the VCO 5 can be controlled by the direct voltage output signal 30 from the discriminator 11 within narrow limits, i.e. the voltage controlled oscillator 5 is caused to change the frequency of its output until the output signal 30 of the phase discriminator 11 is at zero volts, corresponding to a condition wherein the phase angle between the amplified signal 41 and the transmitter reference signal 8 is 90°.

An approximate initial setting of the frequency f is effected by a second control signal 28 supplied to the VCO 5 by a digital/analog (D/A) convertor 26 which is controlled by a computer 27. The D/A convertor 26 is controlled to generate a sawtooth voltage pattern which is employed by the VCO 5 to produce a frequency band. The computer 27 thereby causes the VCO 5 to conduct a sweep of the operating frequency range to search for the resonant frequency. The computer 27 recognizes the leading or lagging of the received phase 40 and then starts frequency measurements. When the desired phase conditions are attained, the sweep is switched off by the computer 27, and the discriminator 11 effects frequency control of the output of the VCO 5. A power amplifier 6 amplifies the alternating voltage U furnished by VCO 5. This alternating voltage U is fed—after having been transformed to a higher voltage level by a transformer 7—to the transmitter 2.

The parameters of the band 1 are determined according to the following formula:

$$f_0 = \frac{1}{2l} \sqrt{\frac{E}{\rho}}$$

where
 $f_0$ = resonant frequency
 $l$ = length of the band
 $E$ = modulus of elasticity of the band
 $\rho$ = density of the band Due to the simple structure of the transmitter 2 and the receiver 3, described further hereunder, a single system frequency (e.g. 41 KHz) can be obtained. All resonant frequencies lower than this system frequency correspond to signal frequencies which can be unequivocally associated with band parameters for the band 1. The system frequency characteristics also thereby become predictable with respect to changes in temperature.

Figure 3:
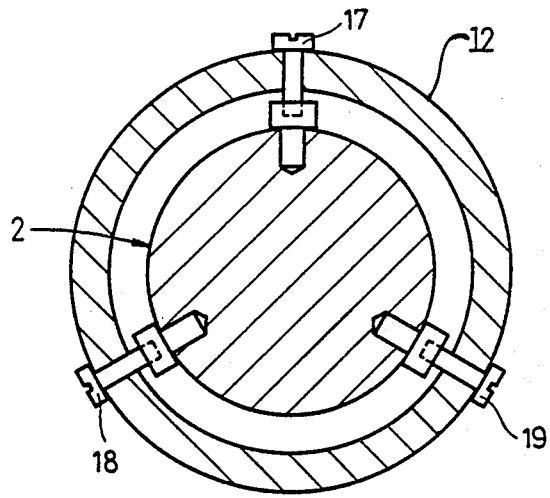
FIG. 3 is a sectional view taken transversely to the longitudinal axis of a support member mounting the transmitter.
Figure 2:
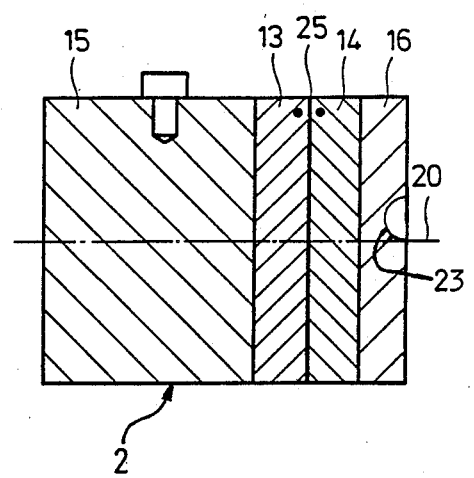
FIG. 2 is a side sectional view of a transmitter used in the invention.

The transmitter 2 (which corresponds to the receiver 3) shown in FIGS. 2 and 3 is a high power transducer of a known type. Both the transmitter 2 and the receiver 3 are composed of two piezoelectric ceramic oscillators (also known as piezo-compression-type oscillators) 13 and 14 disposed between two metal end masses 15 and 16. A potential tap 25 is disposed between the piezo-compression-type oscillators 13 and 14, which are oppositely polarized, to supply voltage to the transmitter 2 or to receive voltage from the receiver 3. All of the respective components for the transmitter 2 and the receiver 3 are attached to one another by an adhesive. The diameter of the oscillators 13 and 14 must be larger than the width of the band 1 which is attached thereto. The diameters of the ceramic elements 13 are 25 mm, the thickness of each is 5 mm. These ceramic elements 13 may be combined with end masses 15, 16 made of brass and aluminum, respectively. In case of brass the thickness of the end masses 15, 16 is 22 mm and 12 mm, respectively. The resulting eigenfrequency is 27 KHz. In the case of aluminum being used for the end masses 15, 16, the end masses 15, 16 have the same thickness of 5 mm. The resulting eigenfrequency is 41 KHz. The band width for both cases is 18 mm.

To maintain the band 1 in tension during operation, the transmitter 2 and the receiver 3 are respectively mechanically supported in the manner shown in FIG. 3, wherein a ring-shaped support member 12 supports the transmitter 2. The receiver 3 is supported by a similar ring-shaped support member 12. Each support member 12 provides a three-point suspension employing three rubber mounts 17–19 with which the cylindrical bodies of the transmitter 2 and the receiver 3, respectively, can be supported by a base plate (not shown) so that the center of gravity of the respective transmitter 2 and receiver 3 are as free of oscillations as possible.

The force transmitted to the band 1 must be transmitted linearly and at a right angle to the frontal face 22 of the mass 16 of the respective one of the transmitter 2 and the receiver 3, so as to generate a longitudinal oscillation of the respective end mass 16. Additionally, the force with which the band 1 is coupled to the respective end mass 16 must be adjustable to correspond to the band characteristics. This also applies for the pre—tension of the band 1. Another significant aspect is that the band 1 must be replaced—at least at discontinuous intervals—i.e. the band 1 must be transported (i.e. inserted or placed) between the transmitter 2 and the receiver 3.

Figure 4:
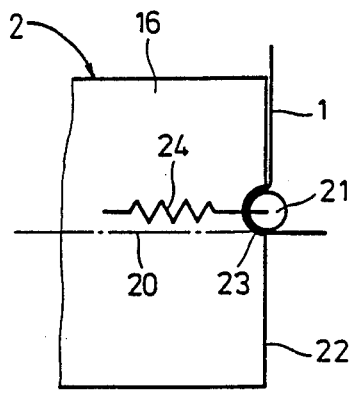
FIG. 4 is a schematic side elevational view of an arrangement for coupling a band to an end face of the transmitter.
Figure 5:
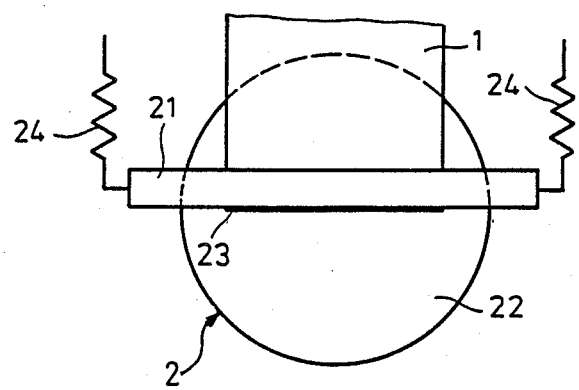
FIG. 5 is a schematic front elevational view of the arrangement of FIG. 4 for coupling the band to the transmitter.

One possible solution for meeting the aforementioned requirement is to provide an apparatus for mounting the band 1 in a spring elastic manner to the transmitter 2 as well as to the receiver 3. As shown in FIGS. 4 and 5, a roller 21 is provided for this purpose which rests in a groove 23 cut into the frontal face 22 of the respective inert end mass 16, with the band 1 being placed therebetween. The band 1 is pressed in the groove 23 by a spring means or pair of springs 24 or the like which may be employed for pressing the roller 21 against the frontal face 22 and the band 1. The force transmission is variable by changing the spring force. The band 1 itself is brought to the roller 21 practically parallel to the frontal face 22, is deflected by 90° about the roller 21 resting in the groove 23, and extends from the frontal face 22 at a right angle thereto in a direction which is parallel to the longitudinal axis 20, which corresponds to the major oscillation direction of the transmitter 2. This results in highly efficient transmission of energy from the transmitter 2 to the band 1, and from the band 1 to the receiver 3.

The present disclosure relates to the subject matter disclosed in German Application No. P 37 33 345.3 of Oct. 2, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. An apparatus for determining the natural frequencies of a longitudinally oscillating band, comprising:
   transmitter means connected to the band for generating longitudinal oscillations in the band; and
   receiver means connected to the band for detecting longitudinal oscillations of the band;
   at least one of said transmitter means and said receiver means having oscillator means with two ends along its longitudinal axis, and end masses connected at each end of said oscillator means, said band being coupled to a frontal face of one of said end masses by a spring-biased roller which is stably received within a groove disposed in said frontal face of said one of said end masses.

2. An apparatus for determining the natural frequencies of a longitudinally oscillating band, comprising:
   transmitter means connected to the band for generating longitudinal oscillations in the band;
   receiver means connected to the band for detecting longitudinal oscillations of the band;
   means for exciting said transmitter means, said means for exciting including oscillator means having two ends disposed along a longitudinal axis, and end masses connected at each end of said oscillator means, said band being fastened to a frontal face of one of said end masses; and
   means for determining the phase difference between oscillations supplied by said transmitter means and oscillations received by said receiver means, whereby a frequency can be determined at which a standing wave condition is detected.

3. An apparatus as claimed in claim 2, wherein said oscillator means are voltage controlled, and said means for determining the phase difference supplies an output signal to control said oscillator means.

4. An apparatus as defined in claim 3, wherein said means for determining the phase difference receives signals from said means for exciting said transmitter means and from said receiver means, and said means for exciting said transmitter means includes an electronic data processing means supplying an output signal which is converted by a digital-to-analog convertor to control operation of said oscillator means.

5. An apparatus for determining the natural frequencies of a longitudinally oscillating band, comprising:
   transmitter means connected to the band for generating longitudinal oscillations in the band; and
   receiver means connected to the band for detecting longitudinal oscillations of the band;
   at least one of said transmitter means and said receiver means having oscillator means with two ends along its longitudinal axis, and end masses connected at each end of said oscillator means, said oscillator means being composed of a plurality of piezoceramic power transducers, the band being coupled to a frontal face of one of said end masses by a spring-biased roller which is stably received within a groove disposed in said frontal face of said one of said end masses such that forces arising due to oscillation of said oscillator means are transmitted to the band acting along said longitudinal axis of said oscillator means, said forces being introduced into the band in a linear manner and at a right angle to said frontal face of said one of said end masses; and spring means exerting a spring force which biases the band, the force transmission to the band being variable by changing the spring force exerted by said spring means.

6. An apparatus as defined in claim 1, wherein each of said end masses is composed of brass.

7. An apparatus as defined in claim 5, wherein one of said end masses composed of brass has a thickness of 22 mm.

8. An apparatus as defined in claim 6, wherein the other one of said end masses composed of brass has a thickness which is substantially equal to 12 mm.

9. An apparatus as defined in claim 1, wherein each of said end masses is composed of aluminum.

10. An apparatus as defined in claim 8, wherein each of said end masses has a thickness which is substantially equal to 5 mm.

11. An apparatus as defined in claim 1, wherein said oscillator means is composed of a plurality of piezoceramic transducers.

12. An apparatus as defined in claim 11, wherein said band is coupled to said one of said end masses such that forces arising due to oscillation of said oscillator means which are transmitted to said band act along the longitudinal axis of said oscillator means.

13. An apparatus as defined in claim 12, wherein the introduction of said forces into the band occurs in a linear manner and at a right angle to the frontal face of said one of said end masses.

14. An apparatus as defined in claim 13, wherein the force transmission to the band is made variable by changing the force exerted by the spring of said spring-biased roller.

* * * * *